METHOD OF FABRICATING A SEMICONDUCTOR MAGNETIC TRANSDUCER

Filed May 28, 1969 3 Sheets-Sheet 1

INVENTOR
EDWARD C. HUDSON JR.
BY
Kenway, Jenney & Hildreth
ATTORNEYS

METHOD OF FABRICATING A SEMICONDUCTOR MAGNETIC TRANSDUCER

Filed May 28, 1969 3 Sheets-Sheet 2

INVENTOR
EDWARD C. HUDSON JR
BY
Kenway, Jenney & Hildreth
ATTORNEYS

METHOD OF FABRICATING A SEMICONDUCTOR MAGNETIC TRANSDUCER

Filed May 28, 1969 3 Sheets-Sheet 3

INVENTOR
EDWARD C. HUDSON JR
BY
Kenway, Jenney & Hildreth
ATTORNEYS

United States Patent Office 3,692,595
Patented Sept. 19, 1972

3,692,595

METHOD OF FABRICATING A SEMICONDUCTOR MAGNETIC TRANSDUCER

Edward C. Hudson, Jr., Derry, N.H., assignor to Hudson Corporation, Londonderry, N.H.
Filed May 28, 1969, Ser. No. 828,665
Int. Cl. H01l 7/44
U.S. Cl. 148—187 6 Claims

ABSTRACT OF THE DISCLOSURE

The semiconductor magnetic transducer disclosed herein is fabricated by first doping a semiconductor wafer so that the concentration of the doping impurity diminishes as a function of distance from one surface of the wafer. An emitter region and a pair of collector regions are then diffused into the one surface of the wafer with the collector regions being equally spaced from the emitter region and on either side thereof. When the base-emitter junction is forward biased, charge carriers flowing from the emitter region are concentrated at the portion of the region furthest from the diffusion surface and are proportioned between the collector regions as a sensitive function of magnetic flux generally parallel to the one surface and in a plane separating the collectors.

BACKGROUND OF THE INVENTION

This invention relates to a semiconductor magnetic transducer and more particularly to such a transducer which is of the differential output type.

This invention is an improvement of the transducer illustrated in my earlier Patent 3,389,230, issued June 18, 1968. The transducer is a form of transistor having a pair of collectors and the output signal is a differential collector current. In the earlier patent, the device is formed by a triple diffusion process, the emitter region being formed subsequent to the formation of the two collector regions in a separate masking operation. In addition to requiring a substantial number of steps to perform the several diffusions needed, the static balance of the devices produced was quite highly dependent upon the accuracy with which registration could be maintained between the several masks used in the fabrication process.

Among the several objects of the present invention may be noted the provision of a differential output magnetic transducer having improved balance characteristics; the provision of such a transducer which may be relatively easily fabricated in a relatively small number of diffusion steps; the provision of such a transducer which is relatively sensitive to magnetic flux, the provision of such a transducer in which the desired signal is not masked by a substantial bias current; the provision of such a transducer which may be produced with a relatively high yield; and the provision of such a transducer which is relatively simple and inexpensive. Other objects and features will be in part apparent and in part pointed out hereinafter.

SUMMARY OF THE INVENTION

Briefly, a semiconductor magnetic transducer according to this invention can be fabricated according to the following method. A wafer is provided which is doped with a first doping material to provide conductivity of a first type, the doping diminishing in concentration as a function of distance from one surface of the wafer. A second doping material is then diffused into at least three areas of the one surface to provide regions having conductivity of a type opposite the first conductivity type, the regions of changed conductivity being shaped to form an emitter region with a collector region on either side thereof, the collector regions being equally spaced from the emitter region. The remaining portion of the wafer forms a base region and, when the base-emitter junction is forward biased, charge carriers flowing from the emitter region are concentrated at the portion thereof which is furthest from the diffusion surface and are proportioned between the two collector regions as a function of the magnetic flux flowing generally in a plane separating the collector regions.

BRIEF DESCRIPTION OF THE DRAWINGS

Corresponding reference characters indicate corresponding parts throughout the several views of the drawings.

DESCRIPTION OF THE PREFERRED EMBODIMENTS

Figure 1:
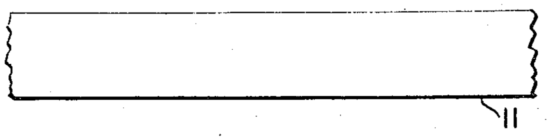
FIGS. 1–5 are sectional views illustrating successive steps in the fabrication of one embodiment of a differential semiconductor magnetic transducer according to the present invention.
Figure 2:
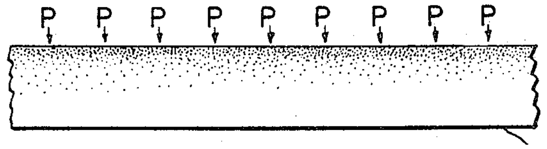
Figure 3:
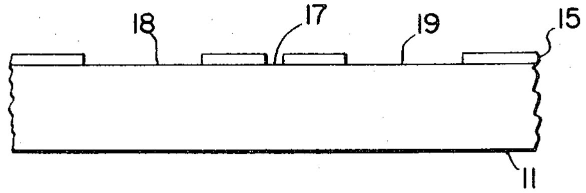
Figure 4:
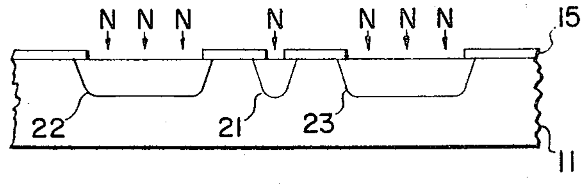
Figure 5:
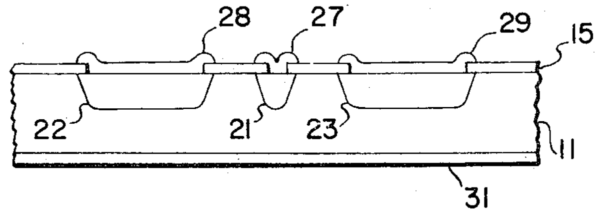

Referring now to FIGS. 1–5, a device according to this invention may conveniently be fabricated starting with a semiconductor wafer, as indicated at 11 in FIG. 1, As is understood, the shape of the wafer is not critical and the use of the term wafer should not be understood to require a particular form. The wafer may, for example, comprise a silicon chip or die which is relatively lightly doped to provide P-type conductivity, e.g. a doping of boron in a concentration of about $10^{15}$ A./cc. (Atoms per cubic centimeter). Additional boron is then diffused into the wafer through its upper surface so that the concentration of the P-type impurity diminishes as a function of distance from the upper surface of the wafer, the concentration at the upper surface being raised to a level of about $10^{18}$ a./cc. This diminishing or graduated concentration is indicated in FIG. 2 by shading but this shading is omitted in the figures showing the subsequent steps to simplify the drawings for illustration purposes.

A diffusion mask is then formed on the upper surface of wafer 11 by depositing a protective layer 15 of silicon dioxide and by selectively etching away the layer, e.g. using known photoresist techniques, to leave exposed areas 17, 18 and 19. As is understood, all three areas 17–19 can be defined or located by a single photographic master and thus accurate relative positioning can be maintained.

An N-type doping impurity is then diffused into the upper surface of wafer 11 through the masking layer 15 so as to create regions of N-type conductivity under the areas 17–19. In other words, the conductivity type of the wafer material under these areas is changed or reversed. The N-type doping impurity may, for example, be phosphorous applied to achieve a concentration of $10^{21}$ A./cc. at the surface.

The areas 17, 18 and 19 are shaped so that the regions of changed conductivity form, respectively, an emitter region 21 with a collector region 22 and 23 on either side thereof, the collector regions being equally spaced from the emitter region. After the emitter and collector regions are formed, areas of metalization 27, 28 and 29 are applied thereto to facilitate connection of these elements to other circuitry, either over the surface of the wafer or by means of leads which may be bonded to the metalized areas. A layer of metalization 31 is also applied to the bottom of the wafer 11 to provide a means of connection to the remaining portion of the wafer material, this remaining portion functioning as a base electrode as is explained in greater detail hereinafter.

Figure 6:
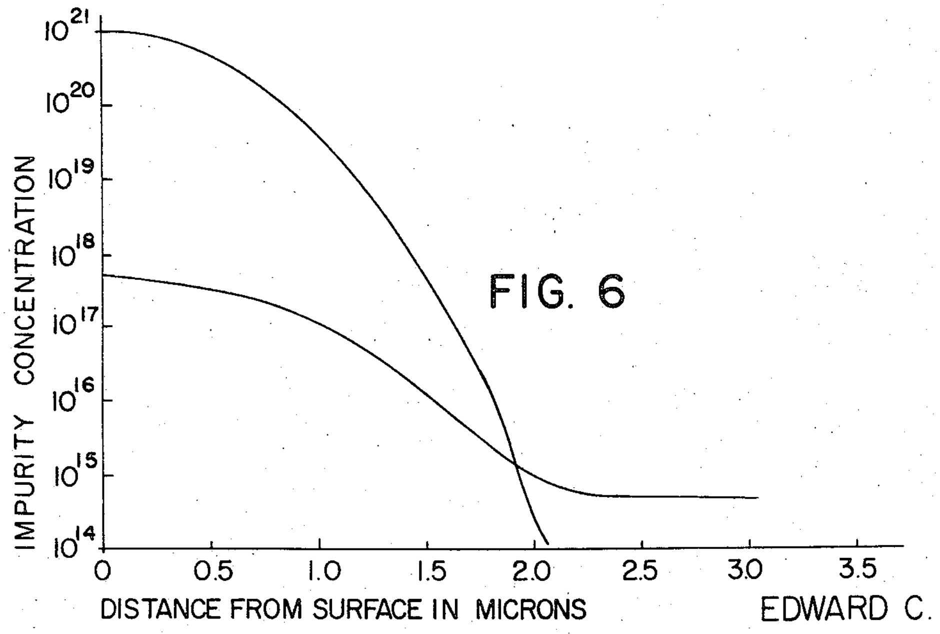
FIG. 6 is a graph representing doping impurity distributions in a transducer fabricated according to FIGS. 1–5.
Figure 7:
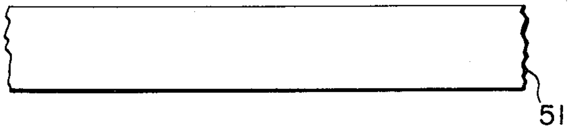
FIGS. 7–15 are sectional views illustrating successive steps in the fabrication of a second embodiment of a transducer according to this invention.

In FIG. 6, the concentrations of the different doping impurities are plotted as functions of the distance from the upper surface of the wafer 11. As may be seen, the concentration of the P-type impurities decreases characteristically from the $10^{18}$ A./cc. level which exists at the surface, down to the approximately $10^{15}$ A./cc. level which is the background or overall doping level of the material wafer 11. The N-type impurity concentration likewise decreases characteristically from the $10^{21}$ A./cc. level at the surface but, as understood, this concentration decreases indefinitely for increasing depth.

The boundary of each of the regions 21–23, i.e. the P–N junction, is taken as being that surface at which the concentration of N-type impurities just matches the concentration of P-type impurities. Thus, figuring from the center of each of the areas 17–19, the P–N junction is at a depth corresponding to the intersection of the N distribution curve and the P distribution curve, i.e. at a depth of about two microns from the upper surface of the wafer 11. This then is the bottom boundary of each of the regions 21–23. The side boundaries, however, are not as far removed from the areas (17–19) through which the doping impurity is diffused as the bottom boundary since the P-type impurity concentration is greater near the surface of the wafer. In other words, at the sides of each of the regions 21–23, the P–N junction occurs at a higher impurity concentration level than at the bottom of the region. As is understood by those skilled in the art, a P–N junction presents a higher barrier voltage at high impurity concentration levels than it does at low impurity concentration levels. Accordingly, it can be seen that, when the base-emitter junction is forward biased, e.g. by applying appropriate potentials to the emitter and base regions, the flow of charge carriers from the emitter region will be concentrated at that portion of the emitter region which is furtherest from the upper surface of the wafer 11. Assuming that appropriate potentials are applied to the collector regions 22 and 23, the flow of charge carriers then divides in the base region beneath the emitter region and most of the carriers reach one collector region or the other. As is understood, some of the carriers are extracted to constitute the base current. Assuming the collector regions are equally spaced from the emitter region, the collector currents will be essentially equal if no magnetic field is present.

As is explained in my earlier patent, referred to hereinbefore, it is presently believed that a space-charge region is formed around a forward biased base-emitter junction and that, in this space-charge region, there is substantially no imbalance of holes or electrons. Thus, with respect to a mobile charge carrier injected into this space-charge region, the region may be considered as intrinsic silicon through which the charge carrier passes with little interference from the crystal lattice. Thus, under these circumstances, each charge carrier behaves much as it would in a vacuum and may be deflected by a magnetic field without appreciable effect from the semiconductor lattice.

As the method of construction illustrated provides a concentration of the charge carriers at the portion of the emitter region furthest from the upper or implantation surface of the wafer, this being essentially the point at which the charge carrier flow starts to divide before flowing to the two collector regions, it can be seen that deflection at this point will cause a substantial alteration of the proportion of charge carriers which go to each collector region. This transducer is quite sensitive to magnetic fields. As is understood, the component of the magnetic field which is effective to produce deflection is that which is in a direction perpendicular to the plane of the drawings of FIGS. 1–5, i.e., flux which is generally parallel to the upper surface of the wafer and in a plane separating the collector regions. It can thus be seen that the device illustrated is a relatively sensitive differential transducer for this component of a magnetic field. The device itself may be utilized in various ways as discussed in my earlier patent.

In addition to concentrating the flow of charge carriers at that portion of the emitter region where deflection by a magnetic field will have the greatest effect on the relative collector currents, the graduated P-type impurity distribution in the silicon wafer has the desirable effect of narrowing the depletion region around each of the collector regions 22 and 23 adjacent the upper surface of the device so that the collector regions may be operated at higher potentials relative to the emitter without causing a punch through.

Figure 8:
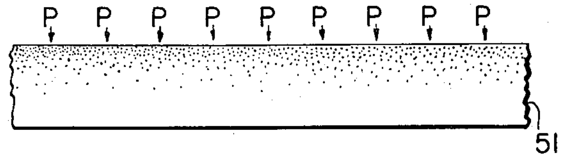
Figure 9:
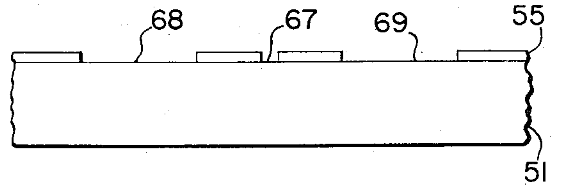
Figure 10:
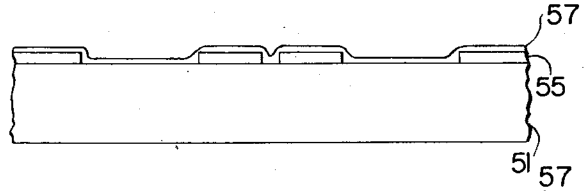
Figure 11:
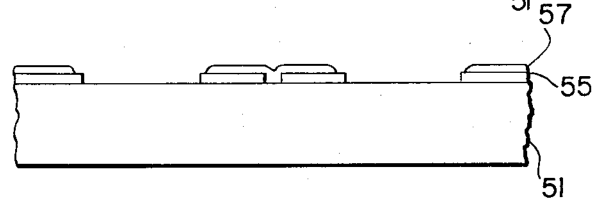

In the method illustrated in FIGS. 7–15, a lightly doped P-type wafer 51 (FIG. 7) is additionally doped with P-type impurities through the upper surface thereof to, as previously, produce a diminishing or graduated impurity distribution (FIG. 8). Likewise, a masking layer 55 is deposited on the substrate 51 and selectively etched away to provide exposed areas 67, 68 and 69 which will eventually define the emitter and collector regions respectively. For reasons which will be apparent hereinafter, layer 55 is preferably deposited relatively heavily so as to be able to withstand subsequent light etchings. After the layer 55 has been selectively etched, a further thin protective layer 57 is laid down over both the preivously exposed areas and the remaining portions of the layer 55, as illustrated in FIG. 10. This thin layer is then selectively etched away as illustrated in FIG. 11 to expose only the areas 68 and 69. The thin layer 57 is preferably etched away beyond the edges of the areas 68 and 69, as illustrated, so that the exposed areas of the substrate are defined by the original masking layer 55 rather than by the layer 57.

Figure 12:
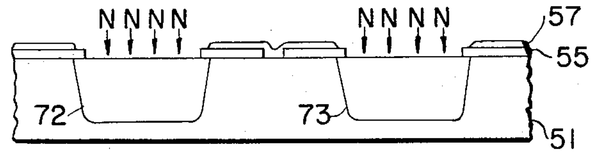

N-type doping impurity material is then diffused into the upper surface of the substrate 51 as illustrated in FIG. 12 thereby creating collector regions 72 and 73 which are of N-type conductivity. Preferably, a relatively long doping period is employed so that the regions 72 and 73 extend relatively deeply into the wafer 51. It will be understood that, in the drawings, this depth has been greatly exaggerated in relation to the thickness of the silicon wafer for purposes of illustration.

Figure 13:
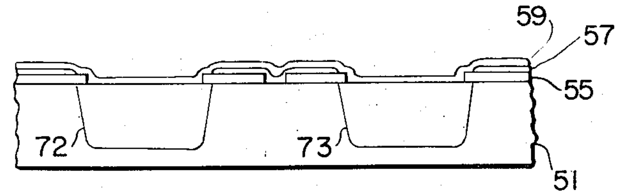
Figure 14:
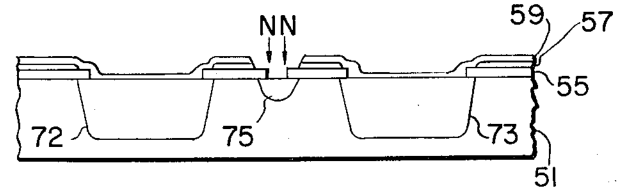

Following diffusion of the collector regions 72 and 73, another thin protective layer 59 is deposited over the upper surface of the device as illustrated in FIG. 13. The layers 59 and 57 are then selectively etched away to expose the emitter-defining area 67 and N-type doping impurities are diffused into the upper surface of the substrate to create an N-type emitter region 75 (FIG. 14). Preferably, a relatively short doping period is used so that the emitter region 75 extends only a relatively short distance into the substrate as compared with the collector regions 72 and 73.

Figure 15:
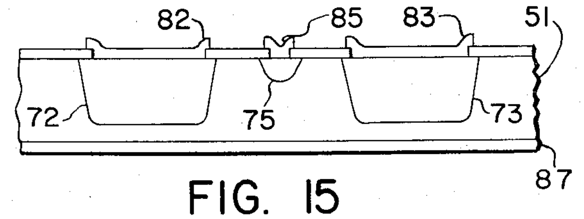

The remaining portions of the layers 57 and 59 are then etched away and metalized areas 82, 83 and 85 are deposited over the collector and emitter regions, as illustrated in FIG. 15, to facilitate circuit connections. Similarly, a layer of metalization 87 is provided for connection to the remaining portion of the material of wafer 51 which, as previously, comprises the base region. An advantage of this construction is that charge carriers flowing from the emitter region 75 do not have to curve around as far to reach a collector region. Accordingly, masking of the differential magnetic transducing signal by diffusion currents is reduced.

While two diffusion steps are required in the method illustrated in FIGS. 7–15, it should be noted that all of the areas through which diffusion takes place are defined by the original mask, i.e. the layer 55, which is formed by a single photographic master. Thus, accurate registration may be provided relatively easily. Accordingly, the collector currents are accurately balanced initially and the device is relatively sensitive to magnetic flux in the differential mode. Again, the graduated concentration of the P-type impurity caused the flow of charge carriers to be concentrated at the bottom of the emitter region where the flow is most significantly affected by a magnetic field.

Figure 16:
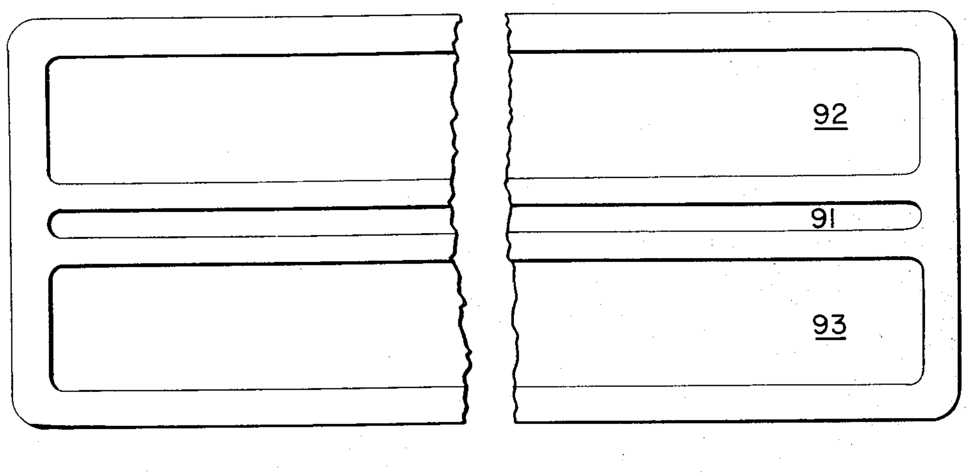
FIG. 16 is a plan view of one arrangement of emitter and collector regions in a transducer of this invention.
Figure 17:
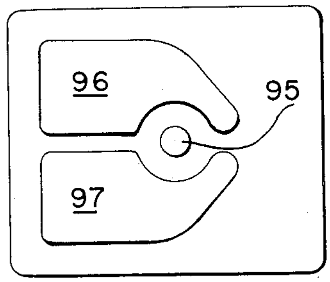
FIG. 17 is a plan view of another arrangement.

With either method of construction, the device may be of any reasonable length, i.e. in a direction normal to the plane of the drawings of FIGS. 1–5 or FIGS. 7–15. A relatively long device is illustrated in FIG. 16, a long relatively thin emitter region 91 having a rectangular collector region 92 and 93 on either side thereof. The device illustrated in FIG. 17, on the other hand, is relatively short, the emitter 95 comprising practically only a dot with the collectors 96 and 97 being wrapped around the emitter region in symmetrical fashion. A short device is preferred where only a relatively short magnetic path can be provided linking the device, e.g. as in the playback of magnetic tape recordings. In both types of constructions the collector regions are substantially equally spaced from the emitter to provide an initial balance of collector currents in the absence of magnetic fields.

In view of the foregoing, it may be seen that several objects of the present invention are achieved and other advantageous results have been attained.

As various changes could be made in the above methods and constructions without departing from the scope of the invention, it should be understood that all matter contained in the above description or shown in the accompanying drawings shall be interpreted as illustrative and not in a limiting sense.

What is claimed is:

1. A method of fabricating a semiconductor magnetic transducer which comprises:

providing a semiconductor wafer which is relatively lightly doped to provide conductivity of a first type;

diffusing into one surface of said wafer a first doping material which provides increased conductivity of said first type thereby to provide a dopant concentration which diminishes as a function of distance from said one surface; and simultaneously diffusing into at least three areas of said one surface a second doping material providing conductivity of a type opposite said first conductivity type, the regions of changed conductivity thereby created being shaped to form an emitter region with a collector region on either side thereof, said collector regions being equally spaced from said emitter region, the remaining portion of said wafer forming a base region, the barrier voltage along the junction between the emitter region and the base region varying in correspondence with the dopant concentration whereby, when the base-emitter junction is forward biased, charge carriers flowing from said emitter region are concentrated at the portion of said emitter region furthest from said surface and are proportioned between said collector regions as a function of the magnetic flux generally parallel to said surface in a plane separating said collector regions.

2. A method of fabricating a semiconductor magnetic transducer which comprises:

providing a semiconductor wafer which is doped with a first material to provide conductivity of a first type, the doping diminishing in concentration as a function of distance from one surface of said wafer;

forming a diffusion mask on said one surface, said mask providing exposed areas on said surface adapted for forming an emitter region and a pair of collector regions, the collector regions being on opposite sides of the emitter region and equally spaced therefrom;

diffusing relatively deeply into the collector forming areas a doping material providing conductivity of a type opposite said first conductivity type;

diffusing relatively shallowly into the emitter forming area a doping material providing conductivity of said opposite type, the remaining portion of said wafer forming a base region, the barrier voltage along the junction between the emitter region and the base region varying in correspondence with the dopant concentration whereby, when the base-emitter junction is forward biased, charge carriers flowing from said emitter region are concentrated at the portion of said emitter region furthest from said surface and are proportioned between said collector regions as a function of the magnetic flux generally parallel to said surface in a plane separating said collector regions.

3. A method as set forth in claim 2 wherein said emitter forming area is round and said collector forming areas are arcuate adjacent said emitter forming area.

4. A method as set forth in claim 2 wherein said emitter forming area is long and relatively narrow and said collector forming areas are elongate and parallel to said emitter forming area.

5. A method as set forth in claim 2 further including the step of forming a protective layer over the emitter forming area prior to diffusing doping material into said collector forming areas.

6. A method as set forth in claim 2 further including the step of forming a protective layer over the collector forming areas prior to diffusing doping material into said emitter forming area.

References Cited

UNITED STATES PATENTS

| | | | |
|---|---|---|---|
| 3,342,650 | 9/1967 | Seki et al. | 148—187 |
| 3,352,726 | 11/1967 | Luce | 148—187 |
| 3,443,173 | 5/1969 | Tsang et al. | 317—235 |
| 3,454,846 | 7/1969 | Haenichen | 317—235 |
| 3,442,723 | 5/1969 | Wakamiya | 148—186 |

FOREIGN PATENTS

| | | | |
|---|---|---|---|
| 805,926 | 12/1958 | Great Britain | 307—309 |

L. DEWAYNE RUTLEDGE, Primary Examiner

J. M. DAVIS, Assistant Examiner

U.S. Cl. XR.

179—100.2; 317—235 Y